J. TAKAMINE.
APPARATUS FOR PRODUCING DIASTATIC PRODUCT.
APPLICATION FILED JAN. 28, 1913.
1,201,385.
Patented Oct. 17, 1916.
2 SHEETS—SHEET 1.
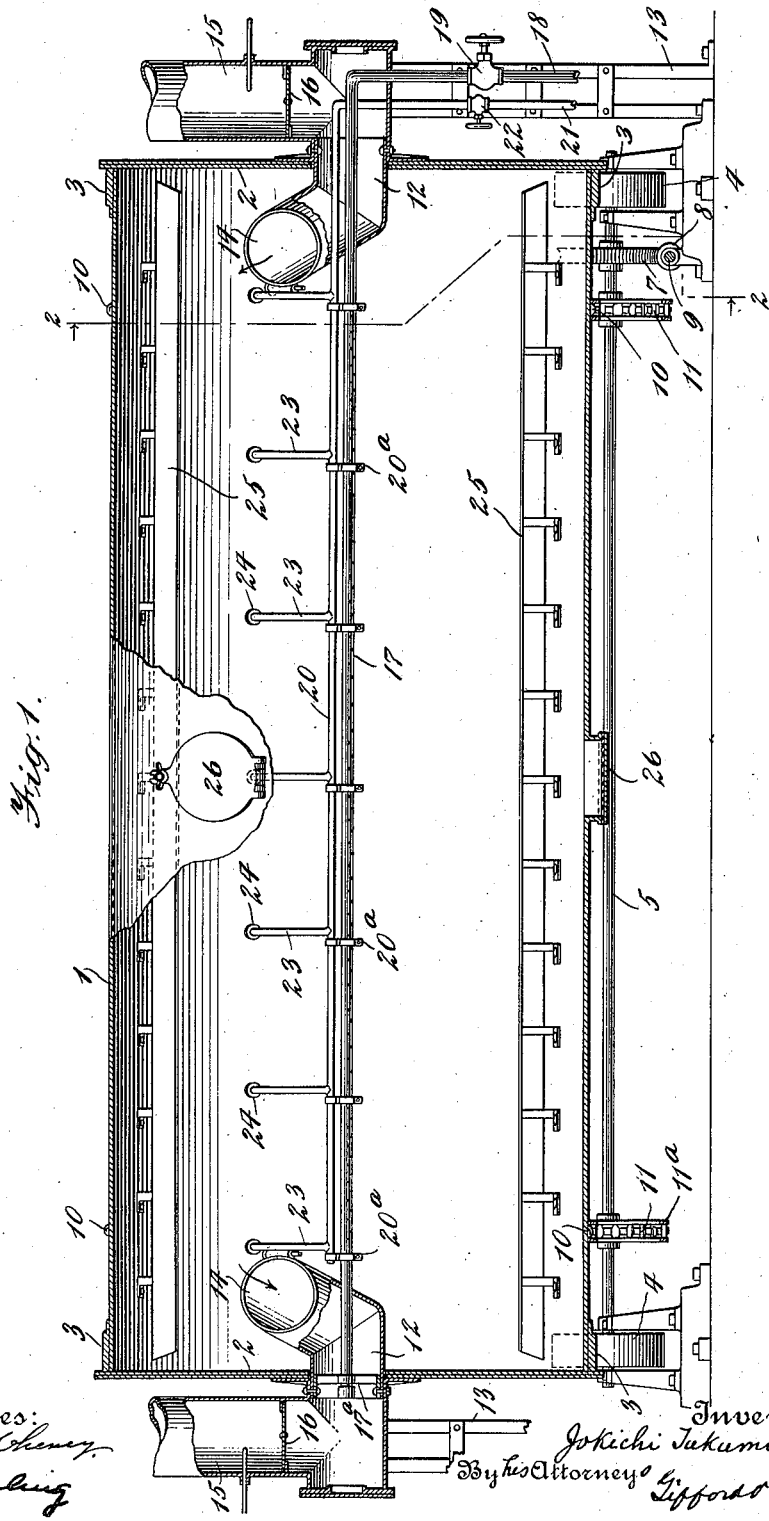

J. TAKAMINE.
APPARATUS FOR PRODUCING DIASTATIC PRODUCT.
APPLICATION FILED JAN. 28, 1913.
1,201,385.
Patented Oct. 17, 1916.
2 SHEETS—SHEET 2.
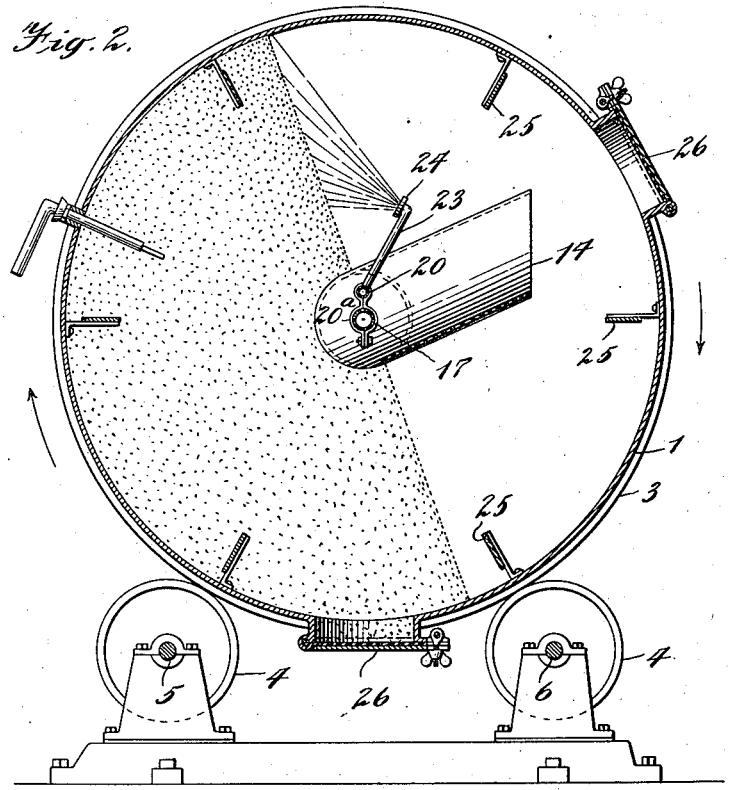
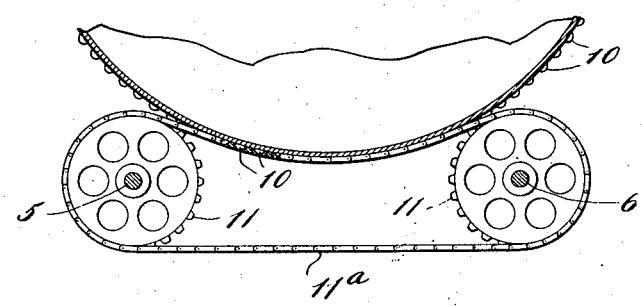

UNITED STATES PATENT OFFICE.

JOKICHI TAKAMINE, OF NEW YORK, N. Y.

APPARATUS FOR PRODUCING DIASTATIC PRODUCT.

1,201,385.  Specification of Letters Patent.  Patented Oct. 17, 1916.

Application filed January 28, 1913. Serial No. 744,609.

*To all whom it may concern:*

Be it known that I, JOKICHI TAKAMINE, a subject of the Emperor of Japan, and a resident of New York city, borough of Manhattan, in the county and State of New York, have invented a new and useful Apparatus for Producing Diastatic Product, of which the following is a specification.

My invention is an apparatus for carrying out a process of producing koji and moyashi.

In the production of koji and moyashi as described in my Letters Patent of the United States numbered 525,820, 525,822 and 525,823, and in my application No. 541,617, filed February 2, 1910, now Patent No. 1,148,938, dated Aug. 3, 1915, the *Aspergillus Oryzæ* spores are mixed with the culture medium such as wheat bran moistened with water. Heretofore, it was supposed that quietude was essential to efficient growth because it was supposed that the superficially mixed spores would be displaced by movement of the culture medium. I have discovered, however, that a certain amount of motion is not only permissible but very advantageous, since it not only does not interfere with the growth, but actually accelerates it and enables large economies to be had in the operation. I have also discovered that when produced in motion, the mycelial growth is different, the filaments being shorter and thicker and the number of branches being greatly increased, thereby increasing the number of ends for heading out in moyashi spores.

Before the apparatus of my present invention, it was the custom to spread the culture medium loosely to a thickness of not exceeding three or four inches, thereby giving the air access to as large a surface as practicable. This not only required an enormous floor space, but made unavoidable the infection of the mass by foreign fungi and bacteria settling down upon it from the air. The labor and expense of installing and operating the apparatus in consequence of the trays on which the culture medium was spread, were also items in which improvement was urgent.

By the use of the apparatus constituting my present invention, the mass may be several feet in thickness—say three or four feet—or even more, while in the old process a thickness of three or four inches was the maximum, and even at that thickness the growth of the fungus was not as satisfactory as that carried on with a thickness of one to two inches.

My present invention embodies an apparatus whereby the mass is agitated continually so that the particles of the mass will be brought to the surface in succession in order to have access to the air. This agitation, however, is not of such violence as to substantially impede the fungus growth though it modifies the character of the mycelial filaments thereof. The agitation is such as to cause the particles to go through a cycle of movement not to exceed about once or twice per minute, by preference, and although this speed of agitation may be increased considerably, I have found that when it reached ten cycles per minute, the growth was materially impeded.

The present invention consists in the apparatus, to be more fully described hereinafter, and the novelty of which will be particularly pointed out and distinctly claimed.

I have fully and clearly illustrated one embodiment of the apparatus constituting my invention in the accompanying drawings, to be taken as part of this specification, and wherein—

Figure 1 is a view in longitudinal vertical section of the apparatus; Fig. 2 is a vertical transverse section on the line 2—2 of Fig. 1, and Fig. 3 is a detailed transverse sectional view of part of the apparatus.

Referring to the drawings by characters of reference, 1 designates a cylindrical drum consisting of a horizontally disposed cylindrical shell closed at its ends by heads 2, said drum being arranged to rotate on its horizontal axis. Any suitable means may be employed for imparting rotation to the drum, but I prefer to provide the same with circumferential end bands 3 which rest upon supporting rolls 4, the latter being mounted on parallel shafts 5, 6, extending longitudinally of the drum, the shaft 5 being provided with a worm gear 7 fixed thereto and meshing with a worm pinion 8 on a driving shaft 9, driven from any suitable source of power. The arrangement is such that the friction pulleys 4 on the shaft 5 rotate the drum through frictional engagement of said pulleys with the bands 3. In order that the drum may not slip relative to the driving pulleys, but will always have a continuous and steady rotation at a constant speed for a given speed of the drive shaft, I provide the drum adjacent each of the ends thereof with a circumferential series of projections 10, equally spaced from each other and engaged by a chain 11ª passing around toothed or recessed wheels 11 fixed to the said driving shaft 5. I do not desire to be limited to the proportions of this drum, but in the drawings have shown the same drawn in Fig. 1 at the scale of $\frac{19}{32}$ inch to 1 foot and in Figs. 2 and 3, at ¾ inch to 1 foot from the commercial machine. Each of the heads 2 of the drum is provided with a central opening through which projects an air conduit 12, each air conduit being mounted upon a suitable frame 13 to hold it stationary during rotation of the drum, it being understood that the drum rotates freely about said conduits. The inner ends of the conduits are directed radially from the drum center as at 14 in the direction of rotation of the drum so that the open ends of said conduits are directed toward the side of the drum which is descending during rotation. These conduits are connected to trunks 15, one of which is connected with a suction blower, so that upon operation of the blower a current of air will be created from the passage or conduit through the cylinder to the drum, and out through the conduit to which the blower is connected. The conduits 15 may be provided with suitable chambers 16 for controlling the flow of air through the drum. These conduits may be of any size which will create proper air circulation conditions in the drum, but in these drawings they are shown to a scale the same as that given above. Extending centrally and longitudinally through the drum is a perforated pipe 17 connected to a feed pipe 18 having a controlling valve 19, by means of which perforated pipe 17 steam or other sterilizing agent may be admitted to the interior of the drum. The pipe 17 may be secured in place by its engagement with the conduits 12 through which it passes, and also be supported at the end opposite to the pipe 18 by a bracket member 17ª mounted in the outlet conduit 12. Also extending through the central portion of the drum at substantially the center thereof and parallel to the pipe 17 is a pipe 20 connected to a feedpipe 21, having a controlling valve 22, which pipe 20 may be employed for admitting water, antiseptic, a spore bearing liquid, or other fluids into the interior of the drum. The pipe 20 is preferably supported in place by pipe thimbles or clamps 20ª surrounding the same and clamped to the pipe 17. The pipe 20 is provided with a plurality of laterally projecting pipes 23, which are inclined to the vertical in the same general direction as that of the rotation of the drum, and toward the descending side of the drum, each pipe carrying at its free end a nozzle tip 24 having its outlet orifices directed to the ascending side of the drum during rotation of the latter. These nozzles are preferably of such a construction as to discharge the liquid from the pipe 20 in an expanding cone form of such diameter that the cones overlap each other, thereby preventing the existence of spaces between the nozzles which would not be subjected to the liquid flowing therefrom. I preferably employ nozzle tips of any of the well-known forms which will discharge the liquid in the form of a fine spray, and will impart a whirling motion thereto so that a solid body of spray will be thrown from each tip toward the material in the drum, as will be presently described.

The drum is provided on its inner surface with inwardly-projecting radial baffles or blades which, as the drum rotates, serve to lift the granular substance or material in the drum and impart thereto a tumbling motion. I prefer to employ in a drum of the proportions described six of these baffles or blades disposed at equal distances around the drum. The baffles are preferably supported a distance from the drum shell to provide a small space through which particles of the medium may fall so that they will not become packed on the baffles as would be the case did the baffles abut the shell throughout their lengths.

I will now proceed to set forth the operation of the above described apparatus in producing a diastase-yielding product. When the apparatus is to be employed for the purpose stated, sufficient culture medium, which may be in the form of bran from cereals, is introduced into the drum to a depth of about three or four feet. The valve 22 may then be opened so as to permit water to flow to the nozzles 24 and be sprayed therefrom upon the culture medium, the flow being permitted to continue until the medium is moistened to the desired degree. During this spraying the drum may be revolved slowly so that the culture medium will be tumbled therein to insure all parts thereof being evenly moistened. The flow of water from the nozzles 24 is then cut off and steam is admitted to the cylinder through the perforated pipe 17 in order to sterilize the medium. When the medium is properly sterilized, it may be cooled by circulating air, by means of the conduits 12, through the interior of the drum. The pipe 21 may then be connected to a liquid antiseptic or an antiseptic carried by water and sprayed into the interior of the drum upon the culture medium by means of the nozzles 24. During this operation the drum may be slowly revolved so as to insure proper mixture of the antiseptic with medium. I then use the pipe 21 with the nozzles 24 to spray *Aspergillus Oryzæ* in the form of spores and known as moyashi, and preferably suspended in water, into the drum and into contact with the culture medium. The drum may then be permitted to rest for preliminary germination, or may be rotated slowly—say, at the rate of about once in five minutes for this period. After this preliminary rest or slow agitation the drum is then rotated for a period of from thirty to forty hours at the rate of one revolution for every one to three minutes, which period is usually sufficient for complete germination of the diastase-bearing product, which, in the present instance, is koji.

It will be understood that during the revolution of the drum, the baffles 25 (heretofore described) serve to carry the bottom portion of the mass of culture medium up and tumble it over the top of the mass, whence it gravitates or tumbles to the bottom of the drum, so that fresh portions of the spore-bearing mass are continuously presented to the action of the air current, it being understood that it is highly desirable for best results that the mass be continuously presented to the air current. By use of the independent nozzles which discharge the liquid in the form of a fine spray or mist, the liquid is thoroughly and evenly disseminated throughout the body of the culture medium and does not result in the formation of balls or lumps, which would be the case were the liquid in the form of streams.

What I claim and desire to secure by Letters Patent of the United States is:

1. An apparatus for manufacturing diastatic product comprising a revoluble drum, means in the drum to tumble material therein, a pipe extending lengthwise of the drum, a plurality of pipes extending upward and laterally from said pipe, each of said pipes having an independent spray nozzle having its outlet directed toward the rising side of the drum.

2. An apparatus for manufacturing diastatic product comprising a revoluble drum, means in the drum to tumble material therein, a pipe extending lengthwise of the drum, a plurality of pipes extending upward and laterally from said pipe, each of said pipes having an independent spray nozzle having its outlet directed toward the rising side of the drum, and means for causing air circulation through the drum.

3. An apparatus for manufacturing diastatic product comprising a revoluble drum, baffles extending lengthwise of the drum, spraying means in the drum, and air conduits entering the ends of the drum, said conduits each having a lateral open ended part arranged with the open end directed toward the descending side of the drum.

4. An apparatus for manufacturing diastatic product comprising a revoluble drum, baffles extending lengthwise of the drum, spraying means in the drum, and air conduits entering the ends of the drum, said conduits each having a lateral open ended part arranged with the open end directed toward the descending side of the drum, and means for causing a flow of air through said conduits.

5. An apparatus for manufacturing diastatic product comprising a revoluble drum, baffles secured to the wall of the drum, a pipe extending lengthwise of the drum, nozzles carried by said pipe and directed toward the rising side of the drum, and inlet and outlet air conduits connected to the ends of the drums respectively and having their orifices directed away from the rising side of the drum.

6. An apparatus for manufacturing diastatic product comprising a revoluble drum, baffles extending lengthwise of the drum, a pipe extending lengthwise of the center of the drum and carrying nozzles directed toward the rising side of the drum, a perforated pipe extending centrally and longitudinally of the drum, and inlet and outlet air conduits entering the respective ends of the drum and having their inner orifices directed toward the descending side of the drum.

In testimony whereof I have hereunto signed my name in the presence of two subscribing witnesses.

JOKICHI TAKAMINE.

Witnesses:
MARY L. BRITT,
ANNA MALLOY.